UNITED STATES PATENT OFFICE.

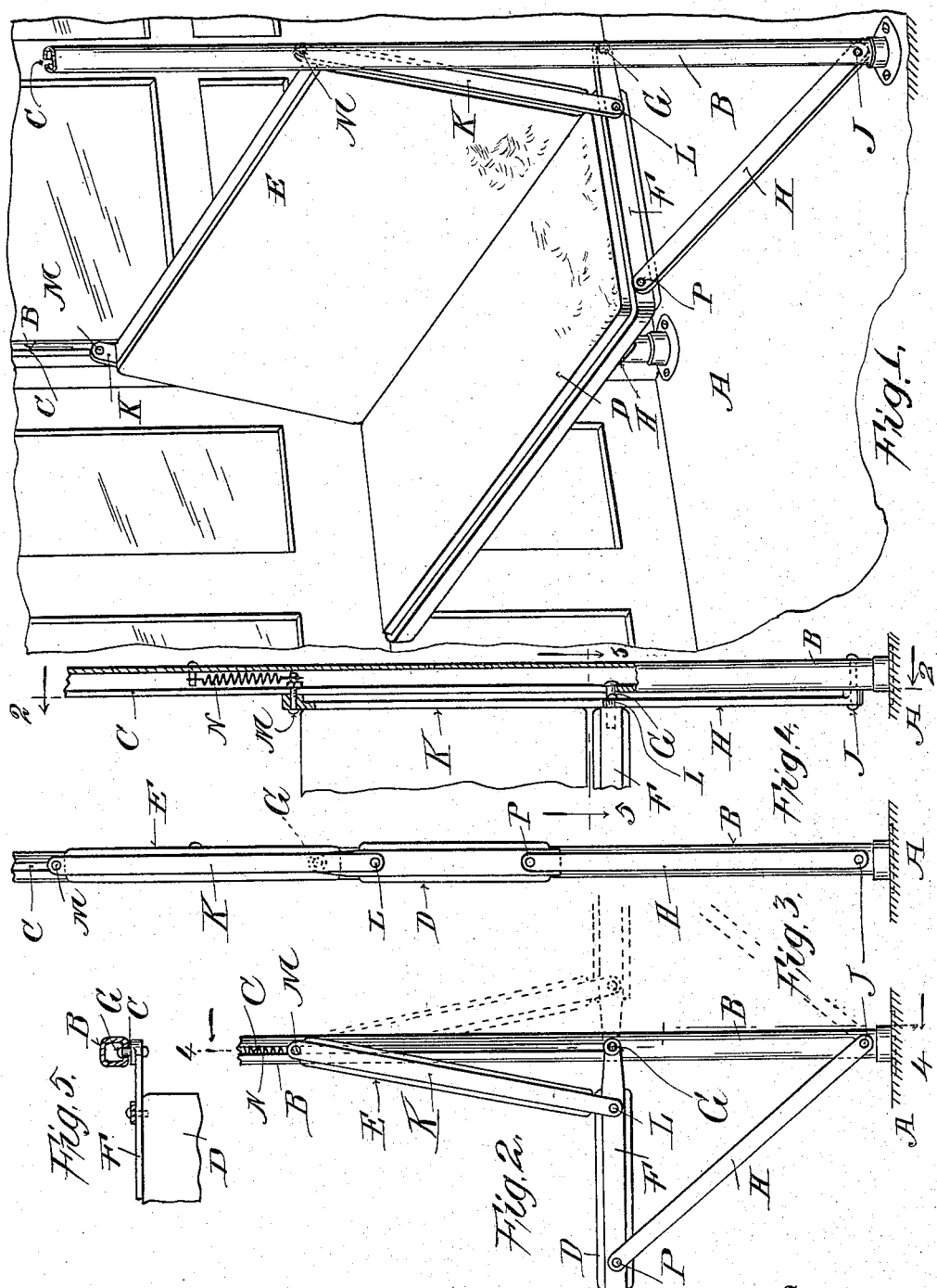

HAROLD ROWNTREE, OF KENILWORTH, ILLINOIS, ASSIGNOR TO NATIONAL PNEUMATIC COMPANY, OF NEW YORK, N. Y., A CORPORATION OF WEST VIRGINIA.

DISAPPEARING AND REVERSIBLE SEAT FOR CARS.

1,170,343. Specification of Letters Patent. Patented Feb. 1, 1916.

Application filed December 27, 1912. Serial No. 738,791.

*To all whom it may concern:*

Be it known that I, HAROLD ROWNTREE, a citizen of the United States, residing at Kenilworth, county of Cook, State of Illinois, have made a certain new and useful Invention in Disappearing and Reversible Seats for Cars, of which the following is a specification.

This invention relates to car seats, and particularly to car seats which are reversible and are disappearing, that is, wherein the car seat may be reversed so as to face forwardly toward either end of the car, and also which may be made to disappear as a seat, that is, moved into position to form a panel.

The object of the invention is to provide a reversible and disappearing car seat which is simple in construction and efficient in operation.

A further object of the invention is to provide a car seat which may face forwardly, whether toward one end of the car or the other, and which may be made to disappear so as to form a vertical panel.

A further object of the invention is to provide for efficiently counterbalancing the parts forming the seat, and to render the same easily operable, when reversed from one position to the other, or when moved into disappearing position.

Other objects of the invention will appear more fully hereinafter.

The invention consists substantially in the construction, combination, location and relative arrangements of parts, all as will be more fully hereinafter described, as shown in the accompanying drawings, and finally pointed out in the appended claims.

In the accompanying drawing, Figure 1 is a view in perspective of a portion of the interior of a car showing a car seat structure with the seat in its open position ready for use, and embodying the principles of my invention. Fig. 2 is a view, parts broken off, in side elevation, of the seat showing the construction for permitting its movement into disappearing and into reverse positions. Fig. 3 is a similar view showing the seat in its disappearing position. Fig. 4 is a broken view in section on the line 4, 4, Fig. 2, looking in the direction of the arrows. Fig. 5 is a broken view in section on the line 5, 5, Fig. 4, looking in the direction of the arrows.

The same part is designated by the same reference sign wherever it occurs throughout the several views.

In the drawing, reference letter A, designates a portion of the interior or seating space of a car, which may be of any suitable type or construction. Arranged within the car are suitable standards B, preferably in the form of tubular standards, and arranged in pairs, said standards having longitudinally extending slots C, in the opposed surface thereof.

The seat is designated by reference letter D, and the back therefor, by the reference letter E. The seat is provided with side members F, having pintles G, arranged to operate or to be received in or to project into the longitudinal slot C, of each of the standards B. When the seat is in its position for use as a seat, the pintles G, rest in the bottoms or against the bottom walls of the longitudinal slots C, in the standards or posts B, and when the seat is made to disappear, or is reversed, the pintles G, move upwardly along the slots C, as the seat D, tilts, first into vertical position for its disappearing relation, and then past the parts B, from a position facing in one direction, to that facing in the other direction, as indicated in full and dotted lines in Fig. 2. In order to support and to guide the seat in its swinging movement, links H, are pivotally attached as at P, to the outer or adjacent the outer ends of the side members F, said links H, also being pivotally connected at their other ends to the post B, adjacent the face thereof, as indicated at J. The back E, is provided with side members K, which at their lower ends are pivotally connected, as at L, to the side members F of the seat, and at their upper ends the back side pieces or members K, are provided with pintles M, which also operate or extend into, for movement along, the longitudinal slots C in the posts B. If desired, and in order to facilitate the movement of the seat, when moved from one position into another, the weight of the parts, and particularly of the back, may be counterbalanced in any suitable and convenient manner. I have shown a spring N, for this purpose, which in the form shown, is located within the hollow standard or post B, and is connected at one end to the pintle M, by which the side members K of the back are engaged and slide through or longitudinally of the slot C, in the post or standard B, the other end of said spring being secured at a convenient point inside the standard B.

The operation of the car seat structure, above described, is exceedingly simple. In Fig. 2 the seat is shown in full lines, in position for use on one side of the standard B. When it is desired to move the seat and its back into disappearing relation to form a vertical panel, for instance, the inner edge of the seat is moved upwardly, that is, the pintles G thereof, are moved upwardly through the slots C, in the standards. The links H, rock about their pivotal connections J, at the base of the standard or post, while the outer edge of the seat swings on the pivots P, constituting a movable fulcrum therefor, while being shifted upwardly, by the swinging movement of the links H. The upper ends of the side members K of the back move vertically, their pintles M, moving upwardly in and along the slots C of the post or standards. The pivotal connections of the lower end of the members K of the back, to the side members F of the seat, cause a relative rocking movement of these members, so that eventually they are brought into vertical line with each other as shown in Fig. 3. In this relation of the parts, the seat has disappeared as a seat and, with its back forms a vertical panel. This panel formed by the seat when in its disappearing position, may be of use and benefit in certain types of fare prepayment cars, as for instance, where the seats are located opposite doorways. When the doorways are not intended for use, the seat will be distended into position to form a seat and will face toward one end of the car or the other as the case may require. But when said doorway is required for use, then the seat is moved into its disappearing position, thereby being removed from obstructing the entry way from the door.

From its disappearing relation, as shown in Fig. 3, the seat may be moved into position for use on one side or the other of the standard or post B, as shown respectively in full and dotted lines in Fig. 2, by simply breaking the alined relation of the pivotal axes formed by the pintles M, G, and the pivotal connections L, J, and P, respectively. This may be accomplished by pushing on the seat at its lower edge, for instance, at a point opposite the point of pivotal connection, indicated at P, of the links H, therewith, the push or pressure being applied in one direction or the other, according to which side of the post, the seat is to be made down. It will of course be understood that where the seat is reversible, the seat proper, D, will be formed into a seat, that is, cushioned or otherwise fashioned to form a seat on both sides thereof, and similarly, the back proper, E, is also suitably cushioned, upholstered, or otherwise formed, on both surfaces thereof, to form a back. One surface of the seat, and the coöperating surface of the back being presented when the seat is made down in one direction and the other surface of the seat and back, respectively, coöperating when the seat is made down into a seat on the other side of the post or standard, or to face in the opposite direction. The function of the spring N, as above indicated, is to counterbalance the weight of the back, to some extent at least, so as to render easy the movement of the parts from position to form a seat into their disappearing position and to require only a small effort on the part of the operator to accomplish this result.

From the foregoing description it will be seen that I provide an exceedingly simple and inexpensive, disappearing and reversible seat, which can be easily manufactured, and when the parts are made of sheet metal can be manufactured with great economy, and which, at the same time is efficient and easily operated.

Having now set forth the objects and nature of my invention, and a construction embodying the principles thereof, what I claim as new and useful, and of my own invention, and desire to secure by Letters Patent of the United States, is:—

1. A combined reversible and disappearing seat comprising side standards longitudinally slotted, a seat having side members provided at their rear ends with pintles engaging in the longitudinal slots of the side standards, a seat back having side members provided with pintles also engaging in said slots, said back side members being pivotally connected to said seat and links pivotally connecting the seat side members and said standards, whereby the seat is reversible into horizontal position from one side to the other of said standards, said back extending down to the plane of the seat when the latter is in horizontal position.

2. A combined disappearing and reversible seat comprising side standards arranged in pairs and longitudinally slotted upon their opposed surfaces, a seat having pintles at its rear edge, said pintles loosely engaging in said slots, a seat back having pintles also loosely engaging in said slots, means for pivotally connecting said back to said seat, whereby when said back is raised vertically the rear edge of said seat is also raised, thereby moving said seat into vertical alinement with the back, the rear edge of the seat being reversible beyond the vertical position of alinement thereof with the back and links to support the seat in horizontal position for use.

3. A combined disappearing and reversible seat comprising side standards, a seat back loosely engaging said standards at the upper part of its ends, a seat also loosely engaging said standards at the rear part of the ends, and means pivotally connecting said back to the ends of said seat whereby when said back is raised vertically, the rear edge of said seat will be raised vertically therewith to draw said seat into vertical alinement therewith, the rear edge of the seat being reversible beyond the vertical position of alinement thereof with the back and links pivotally connecting the standards and seat ends to support the seat in position for use.

4. A combined disappearing and reversible seat structure comprising side standards arranged in pairs and longitudinally slotted upon their opposed surfaces, a seat having its back and rear edge disposed between said standards and engaged in said slots and means for counterbalancing the weight of the parts.

5. A combined disappearing and reversible seat structure comprising side standards arranged in pairs and longitudinally slotted upon their opposed surfaces, a seat, a back therefor, side pieces secured to the back and connected at one end to the sides of the seat, the other ends of the said side pieces, and the rear edge of the seat having pintles disposed and engaging in the slots of said standards and a spring engaging the pintles to the seat back side pieces to exert a tension to counterbalance the weight of the back.

6. In a seat structure, vertical standards having vertical slots therein, a seat having means at each end of the rear edge to engage loosely in the slots of said standards, links pivotally connecting the ends of the seat at its front edge to said standards below the slots therein whereby the front edge of the seat will travel in substantially the arc of a circle described by one end of said link when the rear edge of said seat is raised vertically or reversed beyond said standards to permit the same to disappear into the vertical plane of the standards or to be rocked into horizontal position for use on either side of the standards and a coöperatingly movable seat back having engaging connection with said standards and said seat, and extending down to the plane of the seat when the latter is in horizontal position.

7. A combined disappearing and reversible seat including a tiltable and reversible seat and a movable back, said seat back having pivotal connections with each other for coöperative movement, said seat being vertically movable, rear edge foremost into vertical alinements with the back, and reversible into horizontal position on one side or the other of the back to form a seat and pivotally connected links for supporting the seat when in horizontal position.

In testimony whereof I have hereunto set my hand in the presence of the subscribing witnesses, on this 17th day of December A. D., 1912.

HAROLD ROWNTREE.

Witnesses:
DELLA M. SELOVER,
S. E. DARBY.

Copies of this patent may be obtained for five cents each, by addressing the "Commissioner of Patents, Washington, D. C."